United States Patent
Berengut et al.

(10) Patent No.: US 9,601,865 B2
(45) Date of Patent: Mar. 21, 2017

(54) CLOSURE SEAL FOR ELECTRICAL ADAPTOR

(71) Applicant: AMPFIBIAN HOLDINGS PTY LTD, Woodburn (AU)

(72) Inventors: Jon Berengut, Surry Hills (AU); Oliver Clemens Robert Kratzer, Surry Hills (AU); James Morton, Surry Hills (AU)

(73) Assignee: AMPFIBIAN HOLDINGS PTY. LTD, Woodburn (AU)

( * ) Notice: Subject to any disclaimer, the term of this patent is extended or adjusted under 35 U.S.C. 154(b) by 0 days.

(21) Appl. No.: 15/030,235

(22) PCT Filed: Oct. 21, 2014

(86) PCT No.: PCT/AU2014/000990
§ 371 (c)(1),
(2) Date: Apr. 18, 2016

(87) PCT Pub. No.: WO2015/058237
PCT Pub. Date: Apr. 30, 2015

(65) Prior Publication Data
US 2016/0268723 A1    Sep. 15, 2016

(30) Foreign Application Priority Data
Oct. 21, 2013   (AU) ................................ 2013904047

(51) Int. Cl.
*H01R 13/52*   (2006.01)
*H01R 13/639*  (2006.01)
(Continued)

(52) U.S. Cl.
CPC ..... *H01R 13/5213* (2013.01); *H01R 13/5221* (2013.01); *H01R 13/6392* (2013.01);
(Continued)

(58) Field of Classification Search
CPC ............ H01R 13/5213; H01R 13/6392; H01R 13/713
See application file for complete search history.

(56) References Cited

U.S. PATENT DOCUMENTS 4,861,278 A * 8/1989 McBride ............. H01R 4/2416
439/395
5,217,387 A   6/1993 Hull et al.
(Continued)

FOREIGN PATENT DOCUMENTS

AU    2010100095    3/2010
EP    1432080       6/2004
(Continued)

OTHER PUBLICATIONS

International Search Report for PCT/AU2014/000990 (WO/2015/058237), Completed by the Australian Patent Office on Nov. 21, 2014, 6 Pages.

*Primary Examiner* — Briggitte R Hammond
(74) *Attorney, Agent, or Firm* — Brooks Kushman P.C.

(57) ABSTRACT

A closure seal that provides an environmental seal about an electrical cable which includes an upper sealing block adapted to be clamped to a lower sealing block so that the cable is encompassed by the two sealing blocks, each block composed of a resilient deformable material and includes a pair of spaced apart arms disposed within the blocks. Each arm lying on a line that is substantially radial to the cable and being pivoted at the end remote from the cable. The seal is useful for sealing an electrical adaptor of the type which incorporates a socket that accepts a plug rated to a first maximum current load, a circuit breaker set for the first maximum current load, a residual circuit device and wherein the socket is enclosed in a compartment adapted to receive the plug and the compartment is provided with a releasable cover.

7 Claims, 4 Drawing Sheets

(51) Int. Cl.
*H01R 13/713* (2006.01)
H02G 15/013 (2006.01)
H01R 13/58 (2006.01)
H02G 3/08 (2006.01)

(52) U.S. Cl.
CPC ....... *H01R 13/713* (2013.01); *H01R 13/5202* (2013.01); *H01R 13/5825* (2013.01); *H01R 2201/26* (2013.01); *H02G 3/088* (2013.01); *H02G 15/013* (2013.01)

(56) References Cited

U.S. PATENT DOCUMENTS

| | | | |
|---|---|---|---|
| 6,036,526 A | 3/2000 | Alfis, III | |
| 6,177,634 B1* | 1/2001 | Smith | H02G 15/013 174/92 |
| 6,344,615 B1* | 2/2002 | Nolf | H02G 15/113 174/92 |
| 6,573,455 B1* | 6/2003 | Radelet | H02G 15/113 174/92 |
| 7,285,725 B1 | 10/2007 | Saman | |
| 7,553,181 B1 | 6/2009 | Van Dalinda, III | |
| 8,702,440 B2* | 4/2014 | Nooner | H01R 13/5213 439/279 |
| 2002/0180163 A1* | 12/2002 | Muller | H02G 15/013 277/602 |
| 2003/0026647 A1 | 2/2003 | Sasaki et al. | |
| 2009/0258519 A1* | 10/2009 | Dilmaghanian | H01R 13/40 439/271 |

FOREIGN PATENT DOCUMENTS

| WO | 9602078 | 1/1996 |
|---|---|---|
| WO | 03001631 | 1/2003 |

\* cited by examiner

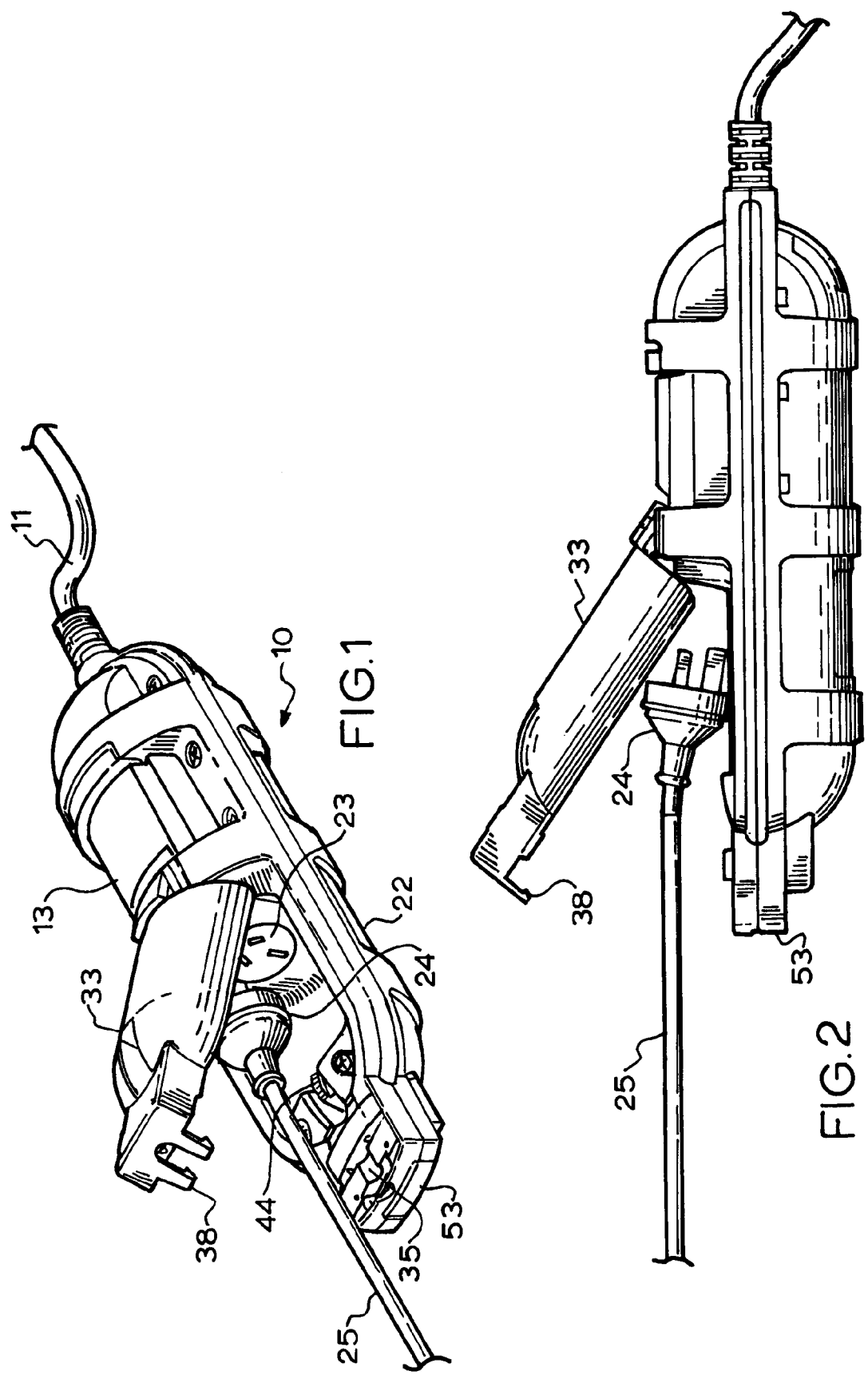

CLOSURE SEAL FOR ELECTRICAL ADAPTOR

CROSS-REFERENCE TO RELATED APPLICATION

This application is the U.S. national phase of PCT Application No. PCT/AU2014/000990 filed on Oct. 21, 2014, which claims priority to AU Patent Application No. 2013904047 filed on Oct. 21, 2013, the disclosures of which are incorporated in their entirety by reference herein.

This invention relates to an improved environmental seal for electrical cables and particularly to an electrical adaptor housing for providing power from a domestic residence to a mobile home or caravan.

BACKGROUND TO THE INVENTION

Most caravan's or RV's have a power source rating of 15 Amps so that a number of appliances can be run at one time. However domestic power outlets are rated to 10 amps. Because of this the plugs and sockets are designed to be incompatible to prevent damaging the domestic power circuits or worse initiate a fire.

Another difficulty with connecting a caravan power to a domestic circuit is that the leads and connections are exposed to the elements and water seeping into the adaptor may result in a dangerous short circuit.

Many patent have addressed the problem of enclosing electrical connectors. The most relevant of these use clam shell configurations with a hinge parallel to the cable. Examples are U.S. Pat. Nos. 5,217,387, 6,036,526, 7,285,725, 7,553,181 and WO03001631. Australian patent 2010100095 by the present applicant discloses an alternative longitudinal clam shell enclosure. However none of these provide effective environmental sealing around the cable which is capable of accommodating a range of cable sizes It is an object of this invention to provide an adaptor that ameliorates these problems.

BRIEF DESCRIPTION OF THE INVENTION

To this end the present invention provides a closure seal that provides an environmental seal about a cable or conduit which includes an upper sealing block adapted to be clamped to a lower sealing block so that the circumference of the cable or conduit is encompassed by the two sealing blocks wherein each sealing block is composed of a resilient deformable material and each block includes a pair of spaced apart arms disposed within said deformable material each arm lying on a line that is substantially radial to said cable, said arms being pivoted at the end remote from said cable or conduit.

This arrangement ensures that the resilient material is always pressed to conform to the outer shape of the cable and to form a watertight seal about the cable no matter what its shape or diameter to prevent the ingress of water along the cable. The seal of this invention is suitable for flexible and rigid cables or conduits which may be out-of-round (say an electrical cable with only two conductors), making it a very fault tolerant system. In the prior art such water tight seals could only be provided for one type of cable for which the adaptor was specifically designed.

Preferably slots are provided in the rear face of the sealing blocks to accommodate the arms. These slots are preferably blind. Preferably, the arms are at either end of a base member which seats on the rear face of each block. Preferably the base member and arms are a truncated triangle when viewed from the side.

This sealing arrangement may be used with any enclosure for electrical connections particularly in outdoor situations. The seal is useful for sealing an electrical adaptor of the type which incorporates a socket that accepts a plug rated to a first maximum current load, a circuit breaker set for said first maximum current load, a residual circuit device compatible to a an electrical circuit rated to a higher maximum current load where in the socket is enclosed in a compartment adapted to receive the plug and the compartment is provided with a releasable cover.

A preferred application of the seal of this invention is for use in outdoor electrical adaptors of the kind described in Australian patent 2010100095. Preferably the seal is adapted to water tightly seal about electrical cables or conduits up to 12 mm in diameter. The enclosure has a hinged lid and a base so that the lid opens in an arc parallel to the line of the electrical cord. The seal of this invention is provided for the lid and base. The releasable cover for the socket compartment ensures that the plug and socket remain dry and protected from the weather. The adaptor includes a plug that is compatible with the external power socket of the caravan or RV.

The adaptor preferably includes a circuit breaker switch that can be turned back on after the circuit has been broken. The switch is also preferably enclosed in a compartment with a releasable cover. Preferably the cover for the socket compartment ant and the cover for the switch compartment are transparent.

DETAILED DESCRIPTION OF THE INVENTION

A preferred embodiment of the invention will now be described with reference to the drawings in which FIG. 1 shows a perspective view of an outdoor adaptor of this invention;

FIG. 2 shows a side elevation of FIG. 1;

Figure 3:
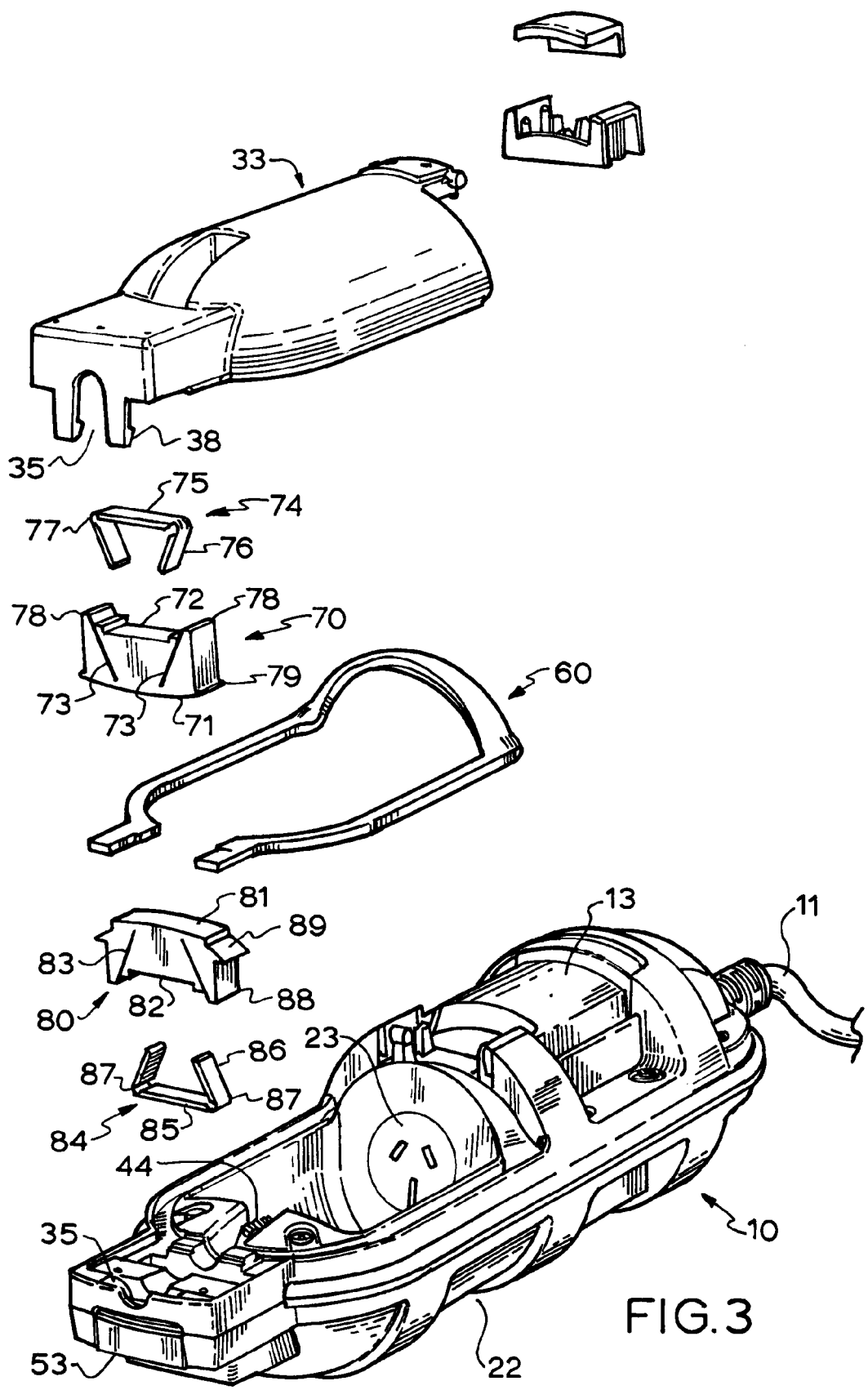
FIG. 3 is an exploded view of the main components of the cover and seal of the adaptor of FIGS. 1 and 2.
Figure 4:
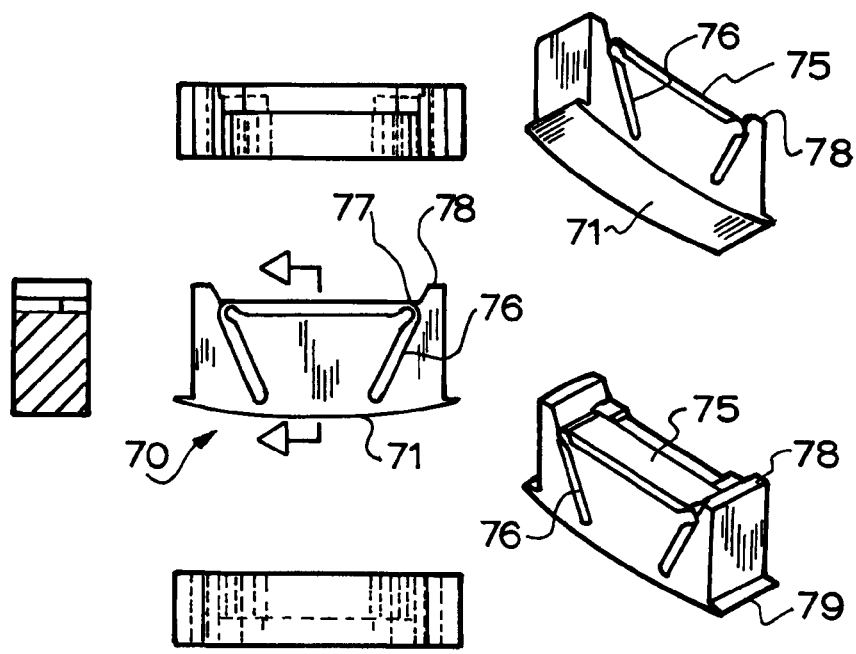
FIG. 4 illustrates a series of views of the upper sealing block.
Figure 5:
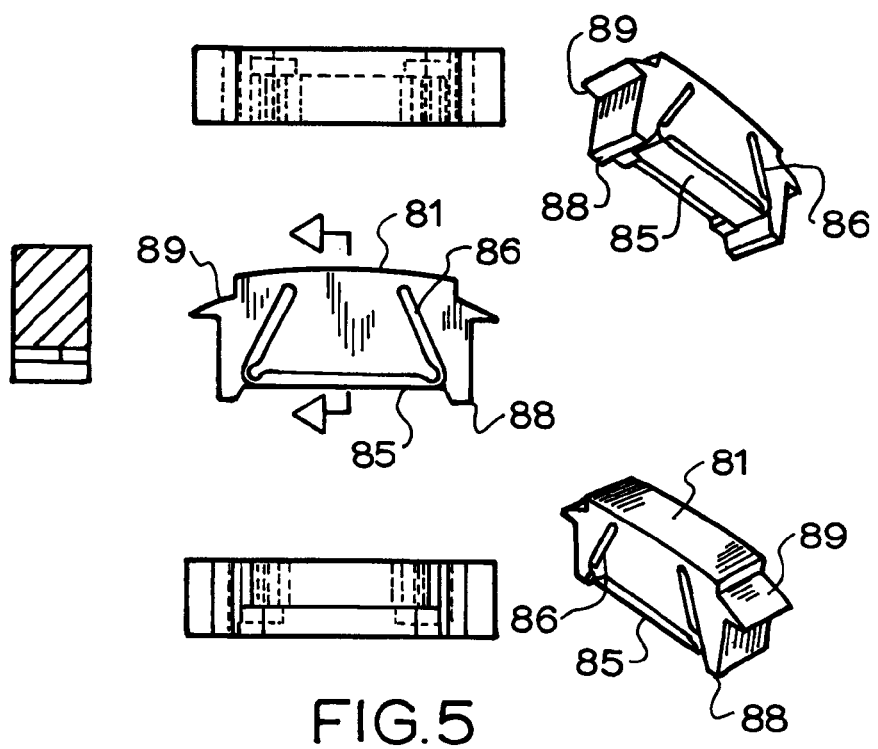
FIG. 5 illustrates a series of views of the lower sealing block.

The outdoor adaptor is of the kind disclosed in Australian patent 2010100095 the contents of which are incorporated here by reference.

The adaptor 10 as illustrated consists of a body 10 having a lead 11 for connection to a caravan or RV. This adaptor is suitable for any application using a current limit different to that of a domestic power outlet. The body includes two covered compartments 13 and 22. Compartment 13 includes the circuit breaker and reset switch protected from the elements by a cover.

Socket compartment 22 includes a socket 23 for a conventional domestic electric plug 24 and cable 25. Compartment 22 is sealed by transparent cover 33 which is releasably locked to the body 10. A sealing bracket 60 abuts the edge of the cover 33 when the cover is closed.

The cover 33 includes a latch portion 34 that incorporates a channel 35 to accommodate the electrical cable 25. Adjacent to the latch portion is the upper sealing block 70 which is complementary to the lower sealing block 80 in the body portion adjacent the body latch mechanism 53. The cover latch includes a pair of snap fit tongues 38 which snaps over the retaining ledge of the body latch mechanism 53.

The lead 25 also rests on the spring loaded cable guide 44 which is located within compartment 22.

When the cover 33 is closed the guide 44 is bent under tension and held under tension by the tongue 38 engaging the ledge. When the release tab 53 is lifted it displaces the tongue 38 away from ledge and the release tension of guide 44 displaces the cover 33 upwards so that the cable 25 and plug 24 can be removed from the compartment 22.

The sealing arrangement of this invention is shown in more detail in FIGS. 3 to 6. The upper sealing block 70 is composed of a resilient, deformable polymeric or rubber foam. The block 70 has a sealing surface 71 and a rear surface 72 with slots 73 extending radially into block 70 toward the centre of surface 71 where the cable 25 is adapted to lie. A plastic spring 74, in the shape of a truncated triangle, has a base 75 that seats in a recess in rear face 72 and arms 76 that fit into the slots 73. Each arm 76 pivots about the junction 77 between the base 75 and each arm 76. The body of block 70 includes location ribs 78 on the ends of rear face 72 and edge flanges 79 at the ends of sealing surface 71. The sealing surface is slightly convex in profile so that it is biased toward the cable 25.

The lower sealing block mirrors the components of the upper sealing block.

Figure 6:
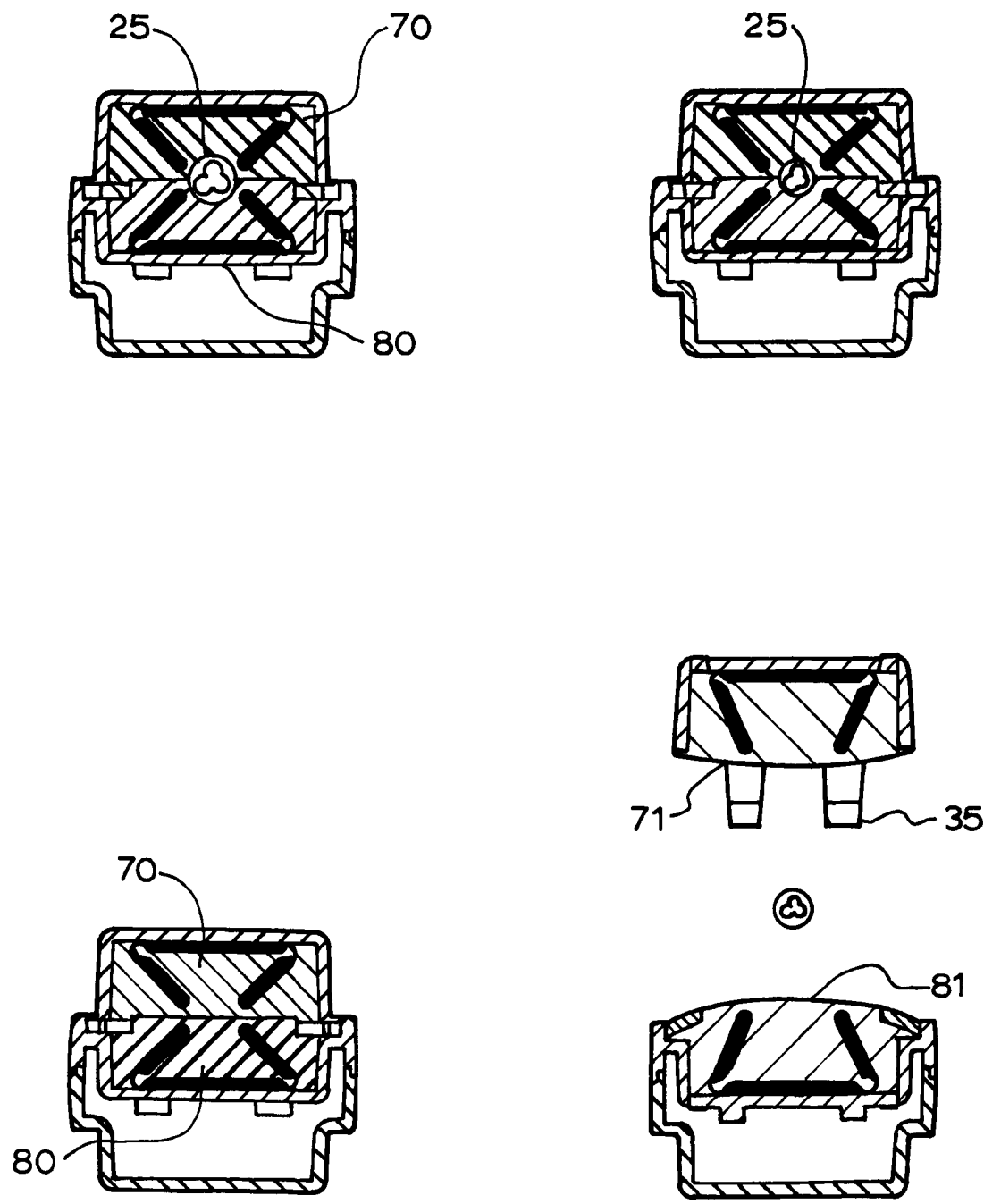
FIG. 6 illustrates a series of schematic illustrations of the upper and lower blocks pressed together and when the enclosure is opened.

The lower sealing block 80 is composed of a resilient, deformable polymeric or rubber foam. The block 80 has a sealing surface 81 and a rear surface 82 with slots 83 extending radially into block 80 toward the centre of surface 81 where the cable 25 is adapted to lie. The plastic spring 84 is equivalent to the spring 74 and has a base 85 that seats in a recess in rear face 82 and arms 86 that fit into the slots 83. Each arm 86 pivots about the junction 87 between the base 85 and each arm 86. The body of block 80 includes location ribs 88 on the ends of rear face 82 and edge flanges 89 at the ends of sealing surface 81 that are held in place by the cover sealing bracket 60. The sealing surface 81 is slightly convex in profile so that it is biased toward the cable 25 and the sealing surface 71 of the upper sealing block 70. As shown in FIG. 6 the sealing surfaces 71 and 81 are biased about the cable 25 no matter what the diameter of the cable is. The radial pivoting arms 76 and 86 press the surfaces 71 and 81 together on either side of the cable 25 so that a flat seal is achieved.

Those skilled in the art will realise that this invention provides a unique, convenient and cost effective solution to the provision of a water tight seal for electrical cables of varying diameters.

Those skilled in the art will also realise that this invention can be implemented in embodiments other than that described without departing from the core teachings of the invention.

The invention claimed is:

1. A closure seal for providing an environmental seal about a cable or conduit lying along an axis, the closure seal comprising:
an upper sealing block adapted to be clamped to a lower sealing block so that the cable or conduit is encompassed by cooperating sealing surfaces of the two sealing blocks wherein each sealing block is composed of a resilient deformable material and each block includes a pair of spaced apart flat spring arms which lie in planes which intersect in a line coaxial with the axis when the sealing blocks are in a clamped position, each flat spring having one end adjacent said cable or conduit and the other end remote from said cable or conduit; said spring arms being disposed within said deformable material each spring arm lying on a line that is substantially radial to said cable or conduit axis when in the clamped position with said spring arms being inwardly pivoted about an end remote from said cable.

2. The closure seal as claimed in claim 1 wherein the sealing surfaces of the two sealing blocks are convex.

3. The closure seal as claimed in claim 1 wherein the two sealing blocks include radial slots outboard of the sealing surface to receive said pair of spring arms.

4. The closure seal as claimed in claim 3 in which the spring arms are dependent from a base member that seats on the surface of each block opposite to the sealing surface.

5. The closure seal as claimed in claim 4 in which the base member and spring arms are a truncated triangle when viewed from a side relative to an axis of the cable or conduit.

6. An electrical adaptor comprising:
a socket that accepts a plug rated to a first maximum current load, a circuit breaker set for said first maximum current load,
a residual circuit device compatible to an electrical circuit rated to a higher maximum current load
wherein the socket is enclosed in a compartment adapted to receive the plug and the compartment is provided with a releasable cover
and a closure seal as claimed in claim 1.

7. The closure seal as claimed in claim 2 wherein the two sealing blocks include radial slots outboard of the sealing surface to receive said pair of spring arms.

* * * * *